United States Patent
Levin et al.

(10) Patent No.: US 6,201,827 B1
(45) Date of Patent: Mar. 13, 2001

(54) SYSTEM AND METHOD FOR PROBABILITY BASED LOCK DETECTION

(75) Inventors: Jeffrey A. Levin; Christopher C. Riddle, both of San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 0 days.

(21) Appl. No.: 09/150,498

(22) Filed: Sep. 9, 1998

(51) Int. Cl.[7] .............................. H04L 27/30; H04B 7/216
(52) U.S. Cl. ................................. 375/150; 370/335
(58) Field of Search .................... 375/150, 140, 375/142, 144, 147, 148, 343; 370/335; 455/65

(56) References Cited

U.S. PATENT DOCUMENTS

| | | | |
|---|---|---|---|
| 4,894,842 | 1/1990 | Broekhoven et al. | 375/150 |
| 4,901,307 | 2/1990 | Gilhousen et al. | 370/320 |
| 5,056,109 | 10/1991 | Gilhousen et al. | 370/342 |
| 5,101,501 | 3/1992 | Gilhousen et al. | 455/452 |
| 5,103,459 | 4/1992 | Gilhousen et al. | 370/206 |
| 5,109,390 | 4/1992 | Gilhousen et al. | 370/335 |
| 5,361,276 | 11/1994 | Sibramanian | 375/150 |
| 5,442,627 | 8/1995 | Viterbi et al. | 370/209 |
| 5,452,331 | 9/1995 | Shihabi et al. | 375/324 |
| 5,490,165 | 2/1996 | Blakeney, II et al. | 370/335 |
| 5,561,618 | 10/1996 | Dehesh | 708/400 |
| 5,644,591 | 7/1997 | Sutton | 375/142 |
| 5,654,979 | 8/1997 | Levin et al. | 375/142 |
| 5,703,902 | 12/1997 | Ziv et al. | 375/228 |
| 5,710,768 * | 1/1998 | Ziv et al. | 370/342 |
| 5,761,204 | 6/1998 | Grob et al. | 370/467 |
| 5,764,687 | 6/1998 | Easton | 375/147 |
| 5,805,648 | 9/1998 | Sutton | 375/367 |
| 5,930,288 * | 7/1999 | Eberhardt | 375/200 |

FOREIGN PATENT DOCUMENTS 2313023    11/1997   (GB).

OTHER PUBLICATIONS

Jin–il Hyun, et al.; Reverse Link Demodulator ASIC for CDMA Cellular System; May 12, 1996; pp. 276–279; IEEE.

Kane Jr. R. E. et al.: "Performance of a Rake Demodulator with Pre–Decision Multipath Thresholding"; Proceedings of the Military Communications Conference. (Milcom), US, NY, IEEE, 1990 pp. 1025–1029, XP000222000 abstract.

* cited by examiner

Primary Examiner—Stephen Chin
Assistant Examiner—Chieh M. Fan
(74) Attorney, Agent, or Firm—Phillip R. Wadsworth; Gregory D. Ogrod

(57) ABSTRACT

The probability based lock detection circuit determines whether a signal is sufficiently strong for communications in a mobile telecommunications system. If a signal is below a maximum energy threshold, the probability based lock detection is used to determine if the receiver is sufficiently capable to detect the signal and combine the signal with other signals received to obtain data transmitted by a mobile telephone. The probability based lock detection involves comparing index representations of maximums of 64 possible energies sent by the mobile telephone that identify that the signal was sent by mobile telephone. A mobile telephone sends signal that arrives to a base station through multiple paths to ensure accurate data transmission. Each signal includes data that identifies the mobile telephone. The probability based lock detection circuit determines whether the index of the maximum of 64 possible values of a signal sent to identify the mobile telephone is the same as the index of the maximum of the 64 possible values as calculated by combining all of signals sent by the mobile telephone.

13 Claims, 5 Drawing Sheets

SYSTEM AND METHOD FOR PROBABILITY BASED LOCK DETECTION

BACKGROUND OF THE INVENTION

1. Field of the Invention

The present invention relates generally to mobile telephone systems, and more particularly to a probability based lock detection method and system for mobile telephone systems.

2. Related Art

Mobile telephone systems allow customers to place telephone calls from wireless devices referred to as mobile telephones or subscriber units. The mobile telephone transmits a signal to a base station. The base station is interconnected to a mobile telephone switch. The mobile telephone switch interconnects the base stations to each other and to public switched telephone networks (PSTNs).

One method that is used for mobile telephone transmission to a base station is via a ground-based antenna that operates in UHF band. This is the same band used for broadcast television transmission. Use of this method limits the subscriber to communication within a cell which is the serving area that the antenna can transmit using UHF band. Subscribers can move from cell to cell because handoffs are possible from one cell to another. However, if no ground-based antenna is within a distance that can be reached using UHF band, such as in a rural area, a subscriber cannot use the mobile telephone.

Developments in mobile telephone system technology have led to mobile telephone systems that can transmit using a low earth orbit (LEO) satellite systems. The mobile telephone systems that use LEO satellite systems can transmit to rural areas because the subscriber does not need to be within a close range of the ground-based antenna. As a result, mobile telephone systems using LEO systems are not limited to major cities as are mobile telephone systems that use ground-based antennas which operate in the UHF band.

The transponder is the component in a satellite that receives and transmits signals from subscribers using mobile telephones. A satellite transponder must be able to carry calls from a large number of subscribers simultaneously in order to be cost effective. Various satellite access schemes such as time division multiplex access (TDMA) and code division multiplex access (CDMA) allow simultaneous access to transponders by a large number of subscribers.

Digital CDMA is preferable to other satellite access schemes as more customers can be carried at a lower cost and higher quality. Low powered signals allow transmission of CDMA signals via small, inexpensive antennas requiring less expensive earth station and network equipment than other satellite access systems. In order to carry the highest number of customers on a CDMA channel, the power must be used efficiently.

In a CDMA system, data from each customer is carried on an individually encoded, modulated, and PN spread channel which is referred to as a traffic channel. Different PN spreading codes are used for different users so that multiple users can share the same wideband channel which is also referred to as a CDMA channel.

Because multiple customers or users share the same wideband channel, if one customer or user's signal is transmitted at a higher power than the other customers or users on the channel, interference may occur which may result in unacceptable performance unless the number of users on the wideband channel is reduced. In addition, lower power transmission helps overcome fading because signals can be spread through more of the wideband channel and more capacity is available in the wideband channel for diverse paths. Lower power transmission also conserves power at the base station. However, if the power of a customer's signal becomes too low, the quality of service for that customer becomes unacceptable.

In order to ensure a high quality of service, the lock status of the received signal is monitored. A signal is in lock if it is strong enough to be received by the base station. A signal is out of lock if it is not strong enough to be received by the base station. Lock detection may be performed by comparing the energy of a Walsh symbol or the average energy of several consecutive Walsh symbols (also referred to as the longterm average energy) with a threshold. If the energy exceeds the threshold, the signal is in lock. If the energy falls below the threshold the signal is out of lock. Walsh symbols, which are described in more detail below, are components of the signal transmitted by the mobile unit. Lock detection is described in more detail in U.S. Pat. No. 5,654,979, entitled "Cell Site Demodulation Architecture For a Spread Spectrum Multiple Access Communication Systems," issued Aug. 5, 1997 to the assignee of the present invention and incorporated herein by reference.

SUMMARY OF THE INVENTION

The present invention includes a method and system of probability based lock detection which determines if a path is in lock. The probability based lock detection is performed by a lock detect loop. Probability based lock detection uses the Walsh symbol error rate (WSER) to improve the accuracy of lock detection of lower powered signals over traditional lock determinations based on a comparison of the long term average maximum Walsh symbol energy with a threshold value. Probability based lock detection compares the index of the maximum correlation energy from each signal with the index of the maximum combined correlation energy. The correlated energies are obtained by correlating the energy of the signal with 64 possible Walsh sequences that could be received from the mobile telephone to identify the mobile telephone. Probability lock detection is a comparison of the performance of one signal received from a mobile telephone with a combination of all of the signals received from a mobile telephone.

Probability based lock detection is particularly useful in systems that track low powered signals. A signal sent by a mobile telephone is sent via multiple paths to ensure accurate transmission. A path is taken by a signal to get from a transmitter to a receiver. One example path is a direct line of sight between a transmitter and a receiver. A signal can also bounce off buildings and mountains taking a different path. The base station equipment has multiple fingers or demodulator front ends assigned to each of the paths. A finger, also referred to as a demodulator front end, is a dedicated piece of hardware that is assigned to a path. Lock is used to determine whether to combine data received on a path by a finger with the data received via other paths. Received signals that are in lock are combined because they will improve the accuracy of the transmission. Enhancements in base station technology have led to an increased number of fingers at base stations that can be assigned to paths. In order to use all of the fingers at a base station, data is received via low power paths. For low power paths, probability lock detection is preferable to traditional lock detection using a comparison of the long term average maximum Walsh symbol energy with a threshold value because the long term average maximum Walsh symbol energy for low power paths is largely attributed to noise.

With probability based lock detection, lock is determined using the Walsh symbol error rate (WSER) which is a calculation of the accuracy of the power measurement of the signal. The lock detect loop comprises functional blocks that calculate the WSER and compare the probability that the energy of the signal is accurate, which is the inverse of the WSER, with a probability threshold. The WSER is calculated by averaging the number of times the index of the maximum Walsh symbol energy matches the index of the combined maximum Walsh symbol energy.

BRIEF DESCRIPTION OF THE FIGURES

The present invention will be described with reference to the accompanying drawings, wherein.

DETAILED DESCRIPTION OF THE PREFERRED EMBODIMENTS

One embodiment of the probability based lock detection of the present invention is in a mobile telephone system that uses low earth orbit (LEO) satellites for transmission and code division multiplex access (CDMA) technology for satellite access.

Figure 1:
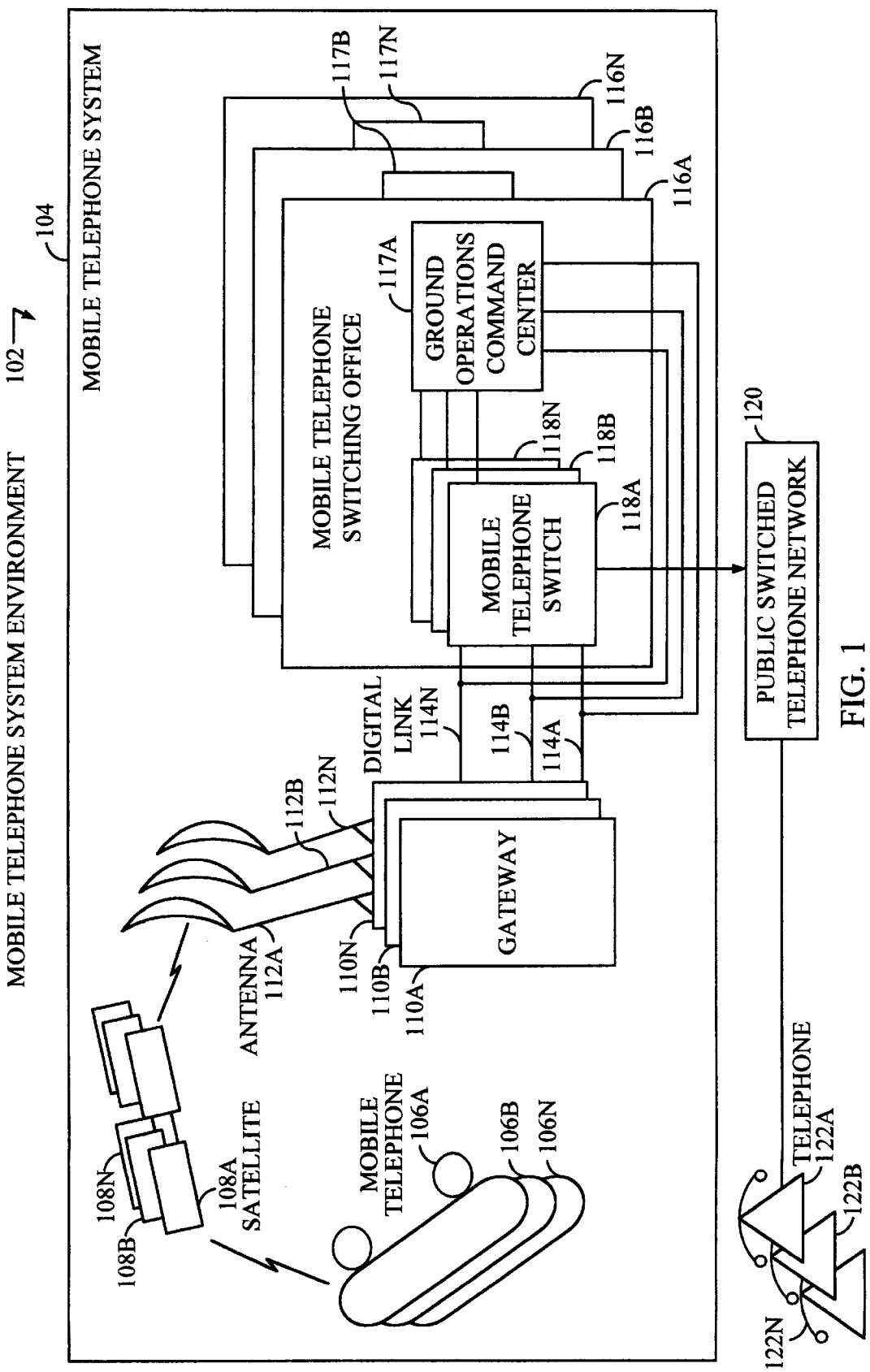
FIG. 1 is a block diagram of a mobile telephone system environment according to a preferred embodiment of the present invention.

FIG. 1 is a block diagram of a satellite based mobile telephone system environment 102. The mobile telephone system 104 which communicates with other networks in the mobile telephone system environment 102 comprises the components related to mobile telephone service. The components for satellite based mobile telephone service are mobile telephones 106A, 106B, . . . 106n, low earth orbit satellites 108A, 108B, . . . 108n, ground-based antennas 112A, 112B, . . . 112n, base stations 110A, 110B, . . . 110n, mobile telephone switches 118A, 118B, 118n, and mobile telephone switching offices 116A, 116B, . . . 116n. The total number of mobile telephone switches 118, base stations 110, satellites 108 and other equipment in a mobile telephone system 104 depends on desired system capacity and other factors well understood in the art. Except as otherwise noted, when the components are referred to generally, they will be referred to with the number designation only and not a letter designation.

Mobile telephones 106 are stand alone units without physical connections that transmit to and receive communication signals from gateways, also referred to as base stations 110, via satellites 108. The mobile telephone 106A transmits to and receives signals from a base station 110A via a satellite 108A that is within range and has capacity to handle the communication. Antennas 112 also are not physically connected but transmit to and receive from satellites 108. Similar to the mobile telephone 106A, the antenna 112A transmits to and receives from a satellite 108A that is within range and has capacity to handle the communication.

Each antenna 112 is physically connected to a base station 110. A base station 110 may be connected to more than one antenna 112. The base station 110 is connected via a digital link 114 to a mobile telephone switch 118 that is located within a mobile telephone switching office 116. A mobile telephone switching office 116 may house more than one mobile telephone switch 118.

An exemplary call can be described by referencing one of the plurality of each of the components illustrated in FIG. 1 that would be used to carry a particular call. A subscriber places a call using a mobile telephone 106A. Other devices that may be used to place a call include a data transceiver, a paging or position determination receiver, a wireless personal computer, and any other device that communicates via telecommunication networks. A large number of subscribers may place calls simultaneously. Each individual mobile telephone 106 is a wireless unit that includes a keypad that will accept dialed digits from a user, an earpiece, and a mouthpiece. Each mobile telephone 106 communicates directly with a satellite 108.

Satellite 108A is one of a number of satellites 108 that comprise a low earth orbit (LEO) satellite system. One such planned LEO satellite system includes 48 satellites traveling in low earth orbits approximately 763 miles from the earth's surface and inclined 50 degrees from the equator. The present invention could be used with other satellite communications including satellite systems located at other distances and orbits, and with terrestrial-based wireless systems.

An antenna 112A receives the signal from the satellite 108A. The antenna transmits the signal to a base station 110A which will be described in further detail with reference to FIG. 2. The base station 110A includes equipment that receives signals from and transmits signals to antenna 112A for access to satellite system 108. The base station 110A is connected to a mobile telephone switch 118A located in a mobile telephone switching office 116A via a digital link 114A, which is also referred to as a land line. Land lines are wired telecommunication links, such as copper or fiber optic cables.

Mobile telephone switch 118A interconnects base stations 110 to each other and to public switched telephone networks such as the exemplary public switched telephone network (PSTN) 120. As mentioned, the mobile telephone switch 118A is located in a mobile telephone switching office 116A which also houses other equipment (not shown) needed to process mobile telephone calls.

The call is received by PSTN 120. PSTN 120 comprises local exchange carrier networks (LECs) and one or more interexchange networks. A LEC has switches and termination equipment within a localized area. An example of a LEC is a local Bell operating company network such as Bell Atlantic, Pacific Bell, etc. If the call is a long distance call, the LEC sends the call to an interexchange network. If the call is a local call, the LEC terminates the call to a telephone 122 or other equipment such as a facsimile or personal computer that can receive calls.

An interexchange network comprises a plurality of switches or exchanges (not shown) that are located throughout a geographic area. For example, a national interexchange network would comprise switches located throughout the nation. When a call is routed to the interexchange network, it is routed to one or more switches within the interexchange network. The interexchange network is used for long distance telephone calls. If the call is routed to an interexchange network, it will terminate via a LEC to a telephone 122 or other equipment for receiving calls.

Mobile telephone systems 104 using code division multiplex access (CDMA) are described in further detail in U.S.

Pat. No. 5,103,459, entitled "System and Method for Generating Signal Waveforms in a CDMA Cellular Telephone System," issued Apr. 17, 1992 to the assignee of the present invention and incorporated herein by reference.

Figure 2:
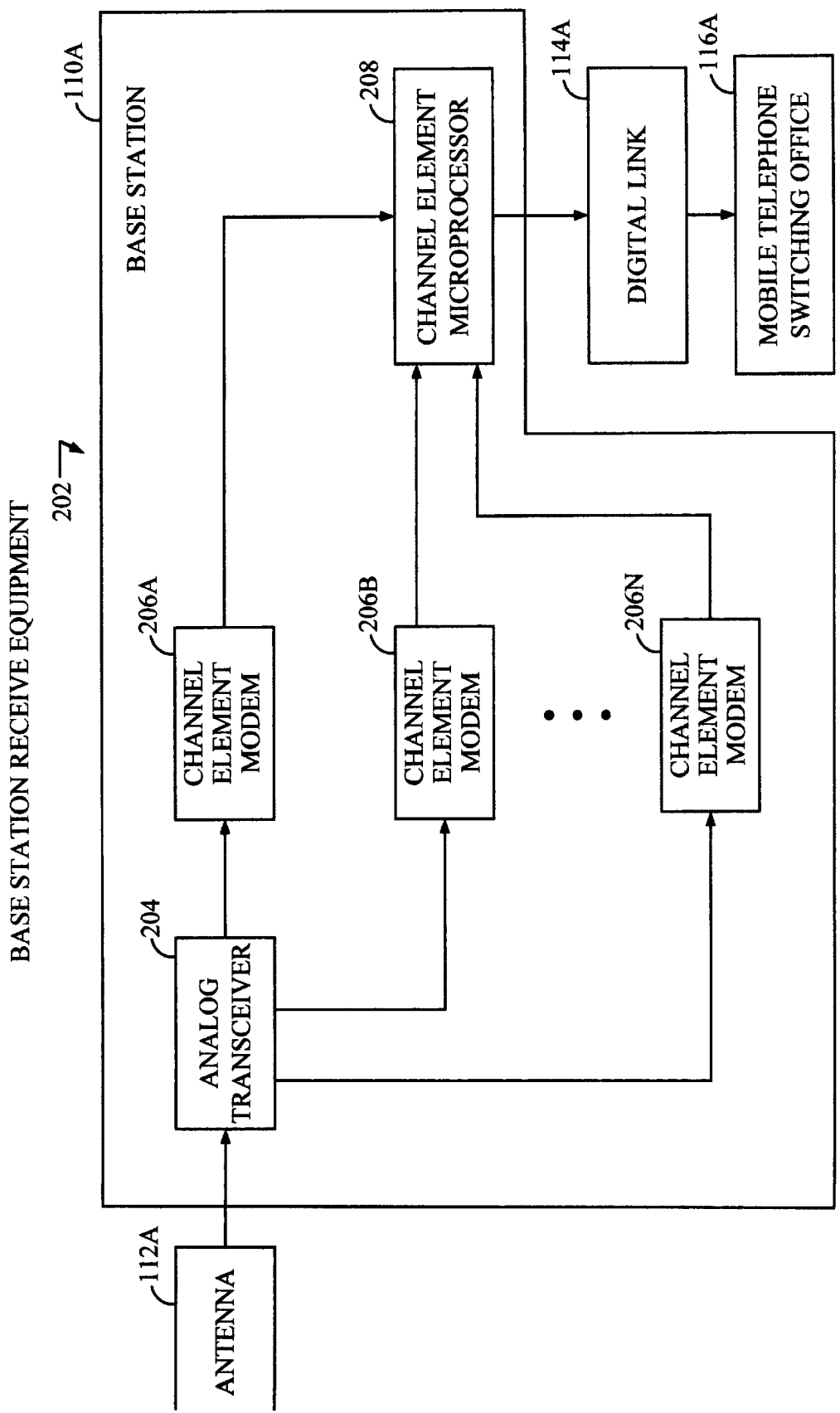
FIG. 2 is a block diagram of base station receive equipment according to a preferred embodiment of the present invention.

FIG. 2 is a block diagram of base station receiving equipment 202. The base station receiving equipment 202 is equipment within a base station that receives and demodulates signals from the ground-based antenna 112 to the mobile telephone switching office 116. The base station also modulates and transmits signals from the mobile telephone switching office 116 to the mobile telephone 106 via the ground-based antenna 112.

The base station receiving equipment 202 comprises an analog transceiver 204 that is connected to the ground-based antenna 112 that received the call, channel element modems 206A . . . 206n that are connected to the analog transceiver 204 and a channel element microprocessor 208 connected to each of the channel element modems 206. The channel element microprocessor 208 is connected to a digital link 114 which transmits signals to the mobile telephone switching office 116.

During the processing of a typical call, a signal is received into the base station 110 by the antenna 112. The antenna transmits the call to an analog transceiver 204. The analog transceiver 204 amplifies and performs frequency down conversion and intermediate band frequency (IF) processing. Frequency down conversion is the conversion down from a radio band frequency (RF) to an IF. LEO satellites 108 transmit signals at frequencies in the RF range. Signals are transmitted on the digital links 114 that interconnect telecommunications network equipment, such as mobile telephone switches 118, at frequencies in the IF range. Conversion of a signal from the RF to the IF and then to digitized samples allows the signal received from the ground-based antenna 112 to be delivered to the channel element modem 206.

Analog transceiver 204 transmits the received and down-converted signal to one or more channel element modems 206. An exemplary channel element modem 206A, also referred to as a digital data receiver and a rake receiver, demodulates the individual subbeams from the wideband channel. The preferred embodiment of the channel element modem is described in the '979 patent referenced above. Two additional embodiments of the channel element modem 206A are also included for reference. One embodiment of the channel element modem 206A is described in U.S. Pat. No. 5,103,459, entitled "System and Method for Generating Signal Waveforms in a CDMA Cellular Telephone System," which issued Apr. 7, 1992 to the assignee of the present invention and is incorporated herein by reference. Another embodiment of the channel element modem 206A is described in U.S. Pat. No. 5,490,165, entitled "Demodulation Element Assignment in a System Capable of Receiving Multiple Signals," issued Feb. 6, 1996 to the assignee of the present invention and is incorporated herein by reference. The channel element modem 206A will be described further with respect to FIGS. 3–5.

The channel element modems 206 are connected to and send their outputs to the channel element microprocessor 208. The channel element microprocessor 208 supervises the demodulation procedure. The channel element microprocessor 208 provides control needed for demodulation, such as the thresholds needed for lock detection. In addition, the channel element microprocessor 208 determines whether a particular channel element modem 206A should switch to a different path. The determination is made based on data received from the channel element modem 206A as to the strength of alternate paths found and the lock status of paths in use. The channel element microprocessor provides an output to the digital link 114A which transmits the signal to the mobile telephone switching office 116A.

Figure 3:
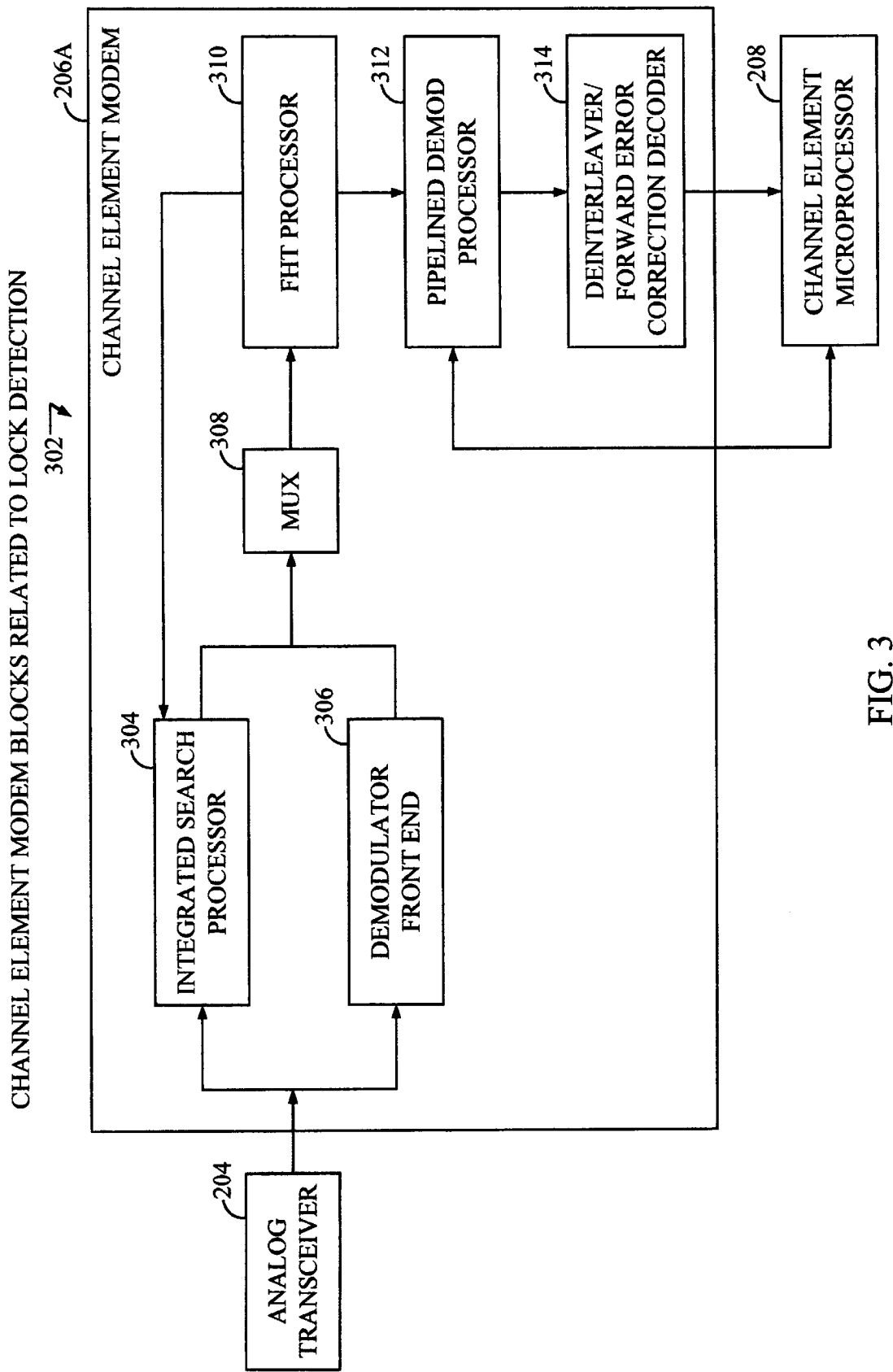
FIG. 3 is a block diagram of channel element modem blocks related to lock detection according to a preferred embodiment of the present invention.

FIG. 3 is a block diagram of channel element modem 206A elements related to lock detection. An integrated search processor 304 and a demodulator front end 306 within the channel element modem 206A are connected to the analog transceiver 204. A signal received by the channel element modem 206A is received into the demodulator front end 306 for despreading and accumulation. The signal received by the demodulator front end 306 is also received by integrated search processor 304 to identify signals that can be used by demodulator front end 306. The demodulator front end 306 and the integrated search processor 304 are connected to a multiplexer (MUX) 308. The MUX 308 is connected to a Fast Hadamard Transform (FHT) processor 310 which receives the signal and produces energies of all possible Walsh sequences. The output of the FHT processor 310 is connected to a pipelined demodulation processor 312 for lock detection, time tracking, combining, and decoding. The pipelined demodulation processor 312 is connected to a deinterleaver/forward error correction decoder 314 for deinterleaving and decoding. The output of the FHT processor 310 is also connected to the integrated search processor 304. The deinterleaver/forward error correction decoder 314 is connected to the channel element microprocessor 208.

The signal that is received from the mobile unit is converted from RF to IF frequency and from analog to digital by the analog transceiver 204 as is described with respect to FIG. 2. The signal is then received by the demodulator front end 306 within the channel element modem 206A for despreading and accumulation. The demodulator front end 306 includes 4–6 demodulator front end blocks, also referred to as fingers. In a preferred embodiment, demodulator front end 306 includes 6 demodulator front end blocks. Each demodulator front end block receives a signal on a different path. Therefore, demodulator front end 306 demodulates 6 signals carried on separate paths. The demodulator front end 306 despreads and accumulates Walsh chip data without regard to which Walsh symbol the chips may correspond.

Like the demodulator front end 306, the integrated search processor 304 receives signals from the analog transceiver 204. However, the integrated search processor 304 does not perform processing of signals that are used to carry a call in progress. The integrated search processor 304 searches for signals that are usable to carry a call so the channel element modem 206A can switch to a different path if the signals on the paths in use fade. Signals fade because the mobile telephone 106A and the satellite 108A transmitting and carrying the signal for the call in progress change position. As these components change position, they may either become too distant to hold the signal or the path between them may be obstructed by another object. If the integrated search processor 304 has found a sufficiently strong signal, the channel element modem 206A can switch to the path associated with that signal for processing the call. The integrated search processor 304 is described in further detail in copending U.S. patent application Ser. No. 08/316,177 entitled, "Multipath Search Processor For a Spread Spectrum Multiple Access Communication System" filed Sep. 30, 1994, assigned to the assignee of the present invention and incorporated herein by reference.

The demodulator front end 306 and the integrated search processor 304 provide symbol data to a FHT processor 310 via the MUX 308. The MUX 308 multiplexes the signal before sending the signal to the FHT processor 310. The FHT processor 310 produces 64 energies for each of 64 possible sequences that could have been sent representing six code symbols. In other words, the FHT processor 310 produces 64 coefficients for each set of 6 symbols. The 64 coefficients are multiplied by a weighting function generated by the channel element microprocessor 208. The weighting function is linked to a demodulated signal strength.

In another embodiment, correlation is performed by a PN correlator with a sequence generated by multiple PN generators. The PN generators produce the PN sequences for the outer code which are the I and Q channel sequences. These sequences are sent to the PN correlator which correlates the sequences with the received signal. The resulting signal is demodulated with respect to the PN sequences. However, in the preferred embodiment, correlation is performed by the FHT processor 310 because correlation with the 64 sequences is more efficient with one Fast Hadamard Transform processor 306 than with 64 parallel PN generators and a PN correlator.

The output of the FHT processor 310 is sent to the pipelined demodulation processor 314. The pipelined demodulation processor 314 also receives the output of the 64 FHT transform energies from the FHT processor 310.

The deinterleaver/forward error correction decoder 314 receives an output signal from the pipelined demodulation processor 312 and deinterleaves and decodes the signal. Both the pipelined demodulation processor 312 and the deinterleaver/forward error correction decoder 314 send output signals to the channel element microprocessor 208.

Figure 4:
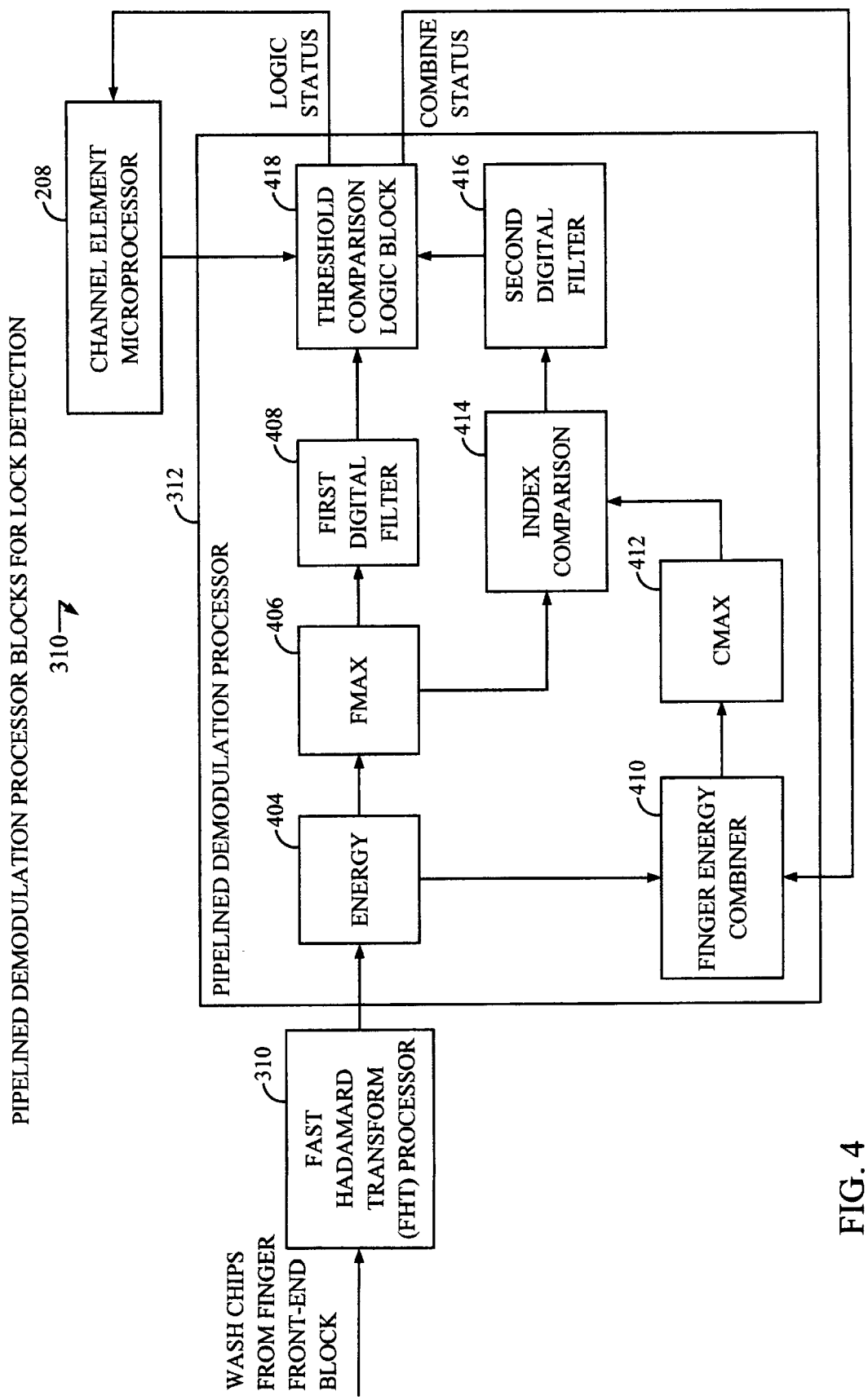
FIG. 4 is a block diagram of pipelined demodulation processor blocks for lock detection.

FIG. 4 is a block diagram of the function blocks for lock detection. In the preferred embodiment of the present invention, lock detection is performed by the pipelined demodulation processor 312 which is implemented using an application specific integrated circuit. However, the present invention is not limited to a pipelined demodulation processor 312 and may be implemented in a non-pipelined demodulation processor or any one or more computer components that are capable of processing computer software. In order to perform lock detection, the pipelined demodulation processor 312 receives inputs from the FHT processor 310 and the channel element microprocessor 208. Multiple blocks within the pipelined demodulation processor 312 perform functions needed to perform lock detection. An energy determination block 404 within the pipelined demodulation processor 312 is connected to the FHT processor 310 to receive the 64 correlated energies for each finger. The pipelined demodulation processor 312 is described in more detail in the above referenced '979 patent.

The energy determination block 404 is connected to the FHT Processor 310 to receive the correlated energies. The energy determination block 404 is also connected to a finger maximum (FMAX) block 406 so the energy determinations can be sent to the FMAX block 406 for calculation of the maximum energy and the index of the maximum energy. In addition, the energy determination block 404 is connected to the finger energy combiner 410. The finger energy combiner 410 is connected to a combined maximum (CMAX) block 412 so the combined energy can be sent to the CMAX block 412. The CMAX block 412 determines the maximum combined energy and the index of the maximum combined energy. Both the FMAX block 406 and the CMAX block 412 are connected to an index comparison block 414. The index comparison block 414 compares the index of the maximum energy of each finger with the index of the maximum combined energy to determine if the indices are identical. Both the FMAX block 406 and the index of comparison block 414 are connected to digital filters.

The FMAX block 406 is connected to a first digital filter 408 and the index comparison block 414 is connected to a second digital filter 416. The first digital filter 408 and the second digital filter 416 are connected to a threshold comparison logic block 418.

The threshold comparison logic block 418 is connected to the channel element microprocessor 208 and the finger energy combiner 410. The threshold comparison logic block 418 receives an energy threshold and a percentage threshold from the channel element microprocessor 208. The threshold comparison logic block 418 compares the filtered maximum energy for each finger received from the FMAX block 406 with an energy threshold and the percentage of indices of the maximum finger energy that are identical to the index of maximum combined energy received from the index comparison block 414 with the percentage threshold and determines a lock status and a combine status. The threshold comparison logic block 418 sends the lock status to the channel element microprocessor 208 and the combine status to the finger energy combiner 410.

The energy determination block 404 within the pipelined demodulation processor 402 determines the energy of each signal carried by a finger or a demodulator front end block. Because a demodulator front end 306 within channel element modem 206 has multiple fingers or demodulator front end blocks, multiple signals can be carried by a channel element modem 206. In a cellular telephone system with ground based antennas 112, each channel element modem 206 has four demodulator front end blocks or fingers. In a preferred embodiment, a channel element modem 206 has six demodulator front end blocks or fingers. In a cellular telephone system, each channel element modem 206 carries four signals. In an exemplary satellite communications system, each channel element modem 206 carries six signals. Because the energy determination block 404 calculates the energy of each of the signals carried by the fingers, in a cellular system, the energy determination block 404 calculates the energy of four signals and in the exemplary system, the energy determination block 404 calculates the energy of six signals.

The FMAX block 406 calculates the maximum energy and the index of the maximum energy for each finger. The FHT processor 310 correlates the received sequences of each of the possible Walsh symbols that may have been transmitted by the mobile telephone 106. The FHT processor 310 outputs a correlation energy corresponding to each possible Walsh index where a higher correlation level corresponds to a higher likelihood that the symbol corresponding to that Walsh index was communicated by the mobile telephone 106. The FMAX 406 block determines the largest of the 64 FHT processor 310 outputs which is the maximum correlation energy. The FMAX block 406 also calculates the index of the maximum correlation energy. The index of the maximum correlation energy is a six digit number that takes one of 64 values representing the maximum correlation energy. The FMAX block 406 sends the maximum correlation energy to the first digital filter 408 and the index of the maximum correlation energy to the index comparison block 414.

The finger energy combiner 410, also referred to as the combiner, receives and combines the correlation energies for all of the fingers. If a cellular telephone system is used, the finger energy combiner 410 receives and combines energies of four signals received on four fingers. In a preferred embodiment of the present invention, the finger energy combiner receives and combines energies of six signals received on six fingers.

The finger energy combiner 410 sums like-indexed correlation energies corresponding to a finger. The finger energy combiner 410 uses the combine status output from the threshold comparison block 418 in determining whether to combine a particular signal received on a finger. If the signal received on the finger is in lock, the finger energy combiner 410 combines the energy of the signal in the total combined energy. If the signal received on the finger is not in lock, the finger energy combiner 410 does not combine the energy of the finger in the total combined energy.

The finger energy combiner 410 sends the combined energy of the signals received on the fingers to the combined maximum energy (CMAX) block 412. The CMAX block 412 determines the maximum combined energy and the index of the maximum combined energy. The process of determining the combined maximum energy is described in detail in the above referenced '979 patent. The index of the maximum combined energy is six digits that may be one of 64 values representing the maximum combined energy. The CMAX block 412 stores energies of each signal to obtain a combined maximum energy that includes the energies of the signals received by all of the fingers of channel element modem 206.

The FMAX block 406 sends the index of the maximum energy for each finger and the CMAX block 412 sends the index of the maximum combined energy to the index comparison block 414. The index comparison block 414 compares the indices of the maximum energy for each finger with the index of the maximum combined energy to determine whether the indices are identical. The index comparison performed by the index comparison block will be described in further detail in step 522 of FIG. 5.

The pipelined demodulation processor 312 has a first digital filter 408 which receives the maximum finger energy for each finger output from the FMAX block 406 and a second digital filter 416 which receives the comparison of the index of the maximum energy for each finger and the index of the maximum combined energy from the index comparison block 414. The first digital filter 408 filters and stores the maximum energies received on the fingers of the channel element modem 206. The second digital filter 416 filters and stores the comparison of the index of the maximum finger energy and the index of the maximum combined energy for the fingers of the channel element modem 206.

The threshold comparison logic block 418 receives the maximum finger energy for each finger from the first digital filter 408 and the comparison of the index of the maximum finger energy and the index of the maximum combined energy for each finger from the second digital filter 416. The threshold comparison logic block 418 receives thresholds for comparison from the channel element microprocessor 208.

The threshold comparison logic block 418 provides two threshold comparisons. The first threshold comparison is a comparison of each maximum finger energy with a maximum finger energy threshold. If the maximum finger energy exceeds the maximum finger energy threshold, then the signal is considered to be in lock. If the maximum finger energy does not exceed the maximum finger energy threshold, the percentage of correct decisions is analyzed to determine lock status.

The second threshold comparison that may be performed by the threshold comparison logic block 418 is a comparison of the percentage of correct decisions of each finger with the percentage of correct decisions threshold. The index of the maximum finger energy is also referred to as a decision because the index is a 6 digit representation calculated by the FMAX block 406 of the maximum energy of the finger. The decision is correct if the index of the maximum energy of the finger is equal to the index of the maximum combined energy. A number of decisions are saved and the percentage of correct decisions is determined. The number of decisions that are saved is modifiable in software and is based on a trade-off between the transient response time and steady state accuracy as is described in further detail in step 524 of FIG. 5. The percentage of correct decisions is compared with a percentage of correct decisions threshold. If the percentage of correct decisions exceeds the percentage of correct decisions threshold, the signal is considered to be in lock. If the percentage of correct decisions does not exceed the percentage of correct decisions threshold, the signal is considered not to be in lock. The process for determining whether the signal is in lock is described in further detail with respect to FIG. 5.

Figure 5:
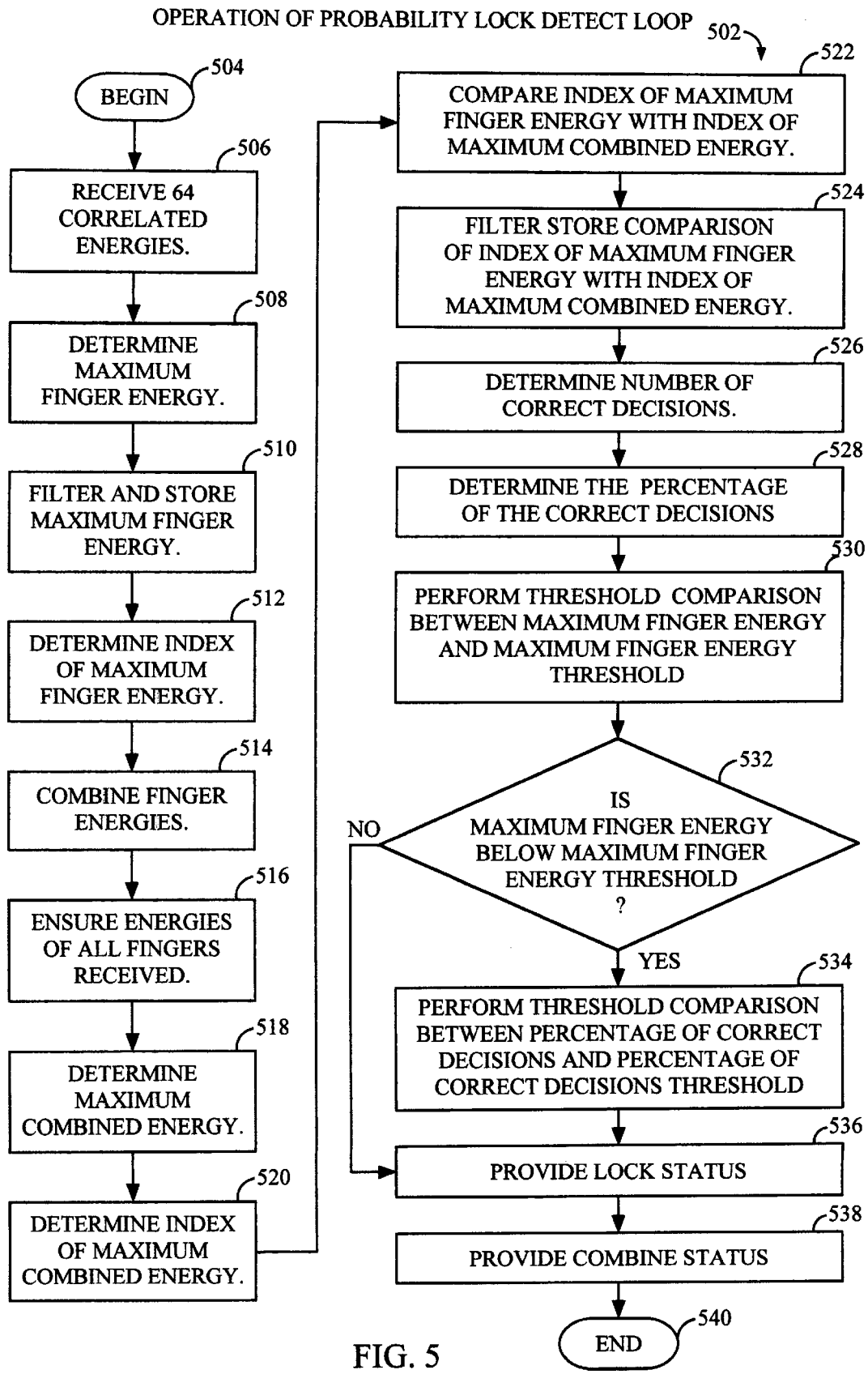
FIG. 5 illustrates the operation of a probability based lock detect loop.

FIG. 5 illustrates the operation of the probability lock detect loop 502. The operation of the probability lock detect loop 502 is described with respect to determining whether the signal received on one finger of the channel element modem 206 is in lock. The operation of the probability lock detect loop 502 is performed by computer software. A skilled programmer could develop the computer software using the functions described. As noted, although in a preferred embodiment, the computer software is implemented in the pipelined demodulation processor 312, the computer software of the present invention may be implemented in any one or more computer components capable of processing computer software.

In step 506, the FHT processor 310 sends 64 correlated energies to the pipelined demodulation processor 312. The mobile telephone 106 sends 1 of 64 possible Walsh sequences. The FHT processor 310 correlates the signal received from mobile telephone 106 with the energies of the 64 possible Walsh sequences that may have been sent by mobile telephone 106. The correlation between the energy of the signal received by mobile telephone 106 with the 64 possible energies is determined which results in 64 correlated energies.

In step 508, the maximum energy of the signal received on the finger is determined. The FMAX block 406 within the pipelined demodulation processor 312 determines the maximum energy of the 64 correlated energies received from the FHT processor 310. The maximum energy of 64 correlated energies is the best guess as to which of the 64 correlated energies was transmitted by the mobile telephone 106. The maximum energy of the 64 correlated energies may also be referred to as the maximum finger energy. The maximum finger energy best represents the sequence of the signal received on the finger of channel element modem 206. The determination of a maximum finger energy is also referred to as a decision because it is a decision by the FMAX block 406 of what sequence was transmitted by mobile telephone 106.

In step 510, the maximum finger energy is filtered and stored. The first digital filter 408 receives the maximum of the correlated energies from the FMAX block 406. The first digital filter 408 filters and stores the maximum finger energy. The maximum finger energy is stored until the energies of the signals received by all of the fingers are determined. Storing the maximum finger energy allows the maximum finger energy to be compared to the maximum combined energy including maximum finger energies of signals received on all of the fingers of channel element modem 206.

In step 512, the index of the maximum finger energy is determined. The index of the maximum finger energy is a six bit number representing the maximum finger energy.

In step 514, the finger energy combiner 410 combines the energies of the signals received by fingers in channel element modem 206. The finger energy combiner 410 receives the combined status from the threshold comparison logic block 418 and combines the energies of the signals that are in lock. The finger energy combiner 410 provides 64 combined energies for the 64 possible sequences that may have been sent. Each of the 64 combined energies includes all of the energies of the signals in lock received on all of the fingers of channel element modem 206.

In step 516, the CMAX block 412 ensures that the energies of the signals of all of the fingers in channel element modem 206 have been received. The CMAX block ensures that the energies of the signals of all of the fingers in channel element modem 206 have been received prior to determining the maximum combined energy to ensure the maximum combined energy reflects the combined energy of all received signals that are in lock. The purpose of receiving multiple signals from mobile telephone 106 is to improve the accuracy of the determination of what data was transmitted. The accuracy is maximized by ensuring that the energies of all received signals are available to be combined.

In step 518, the CMAX block 412 determines maximum combined energy. The maximum combined energy is the maximum of the 64 combined energies that are received from finger energy combiner 410. Similar to the maximum finger energy, the maximum combined energy is a best guess as to the sequence that was sent by the mobile telephone 106. However, the maximum combined energy is a more accurate guess because the maximum combined energy is determined using 64 combined energies of all of the signals in lock that are received on fingers in channel element modem 206. In contrast, the maximum finger energy represents the maximum of 64 energies of one signal that is received on one finger in channel element modem 206.

In step 520, the CMAX block 412 determines the index of maximum combined energy. The index of the maximum combined energy is a six digit number representing the maximum combined energy.

In step 522, the index comparison block 414 compares the index of the maximum finger energy with the index of the maximum combined energy. The index of the maximum finger energy represents a decision made by the FMAX block 406 as to the sequence that was sent by mobile telephone 106. Because the maximum finger energy is the maximum of the 64 energies produced by correlating one signal received on one finger from mobile telephone 106 with 64 energies of possible sequences sent by mobile telephone 106, the maximum finger energy is the best guess by the FMAX block 406 of the sequence sent by mobile telephone 106 based on just the energies produced by correlating the signal received on one particular finger. The index of the maximum finger energy is compared with the index of the maximum combined energy to determine how the decision made by the FMAX block 406 using the energy of the signal received on a particular finger compares to a decision made by the CMAX block 412 using the energy of signals received on other fingers. If the index of the maximum finger energy is the same as the index of the maximum combined energy, the decision is considered correct because the decision made by the finger is identical to the decisions made by other fingers.

For a path in which one of 64 orthogonal functions was sent, the result of the comparison of the index of the maximum finger energy with the index of the maximum combined energy is a 6 bit number. The index comparison is done on a bit-by-bit basis. For each bit, the resulting comparison is either a 0 or a 1 depending on whether the bits being compared are the same. For example, an index of the maximum finger energy may be 000111 and an index of the maximum combined energy is 001111. In this example, if 1 is used to show the bits are the same, the comparison result is 110111.

A "correct decision" is an identical comparison or in the hypothetical above, a comparison resulting in all 1'. For example, if the index of the maximum finger energy is 000111 and the index of the maximum combined energy is 001111, the decision is not correct. The only decisions that are correct are identical. An example of a correct decision is a maximum finger energy index of 001111 and a index of maximum combined energy is 000111. The resulting comparison is 111111.

In step 524, the second digital filter 416 filters and stores the comparison of the index of the maximum finger energy with the index of the maximum combined finger energy. Determining the number of comparisons to be stored involves a trade off between the transient response time and steady state accuracy. If the signal is carried on a circuit that has a transient response, the signal changes over time. A circuit is a connection between various components to transmit a signal. The components need not be physically connected to form a circuit as long as a signal can be transmitted between them. If a transient response is associated with a signal, if 100 decisions are saved, the first 10 may be identical and the next 90 not identical because over time the ability to detect the signal is lost. The result is that the signal is determined to be in lock after the 100 decisions are collected. However, the signal is not in lock by the time the 100 decisions are collected because the ability to detect the signal was lost after the first 10 decisions are collected. If the circuit is operating in steady state, determination of lock accuracy would increase as the number of saved decisions increases. A signal transmitting on a steady state circuit does not change over time because the circuit' ability to transmit the signal does not change over time. In other words, if the performance of the circuit does not change over time, saving 100 decisions is more accurate than saving 10.

In step 526, the threshold comparison logic block 418 determines the number of correct decisions of a signal received on a finger.

In step 528, the threshold comparison logic block 418 determines the percentage of correct decisions.

In step 530, the threshold comparison logic box 418 performs threshold comparison between maximum finger energy and maximum finger energy threshold. The longterm average of the maximum energy is compared to a threshold to determine if a finger is in lock and should be combined.

In step 532, the threshold comparison logic block 418 determines whether maximum finger energy is below the maximum finger energy threshold. Combining a finger using unweighted energy combining will improve performance of the channel element modem if the finger has a signal-to-noise ratio (SNR) of no more than 6 db $E_b/N_o$ lower than the strongest finger. So, if the strongest finger is 4 db $E_b/N_o$, then other fingers should not be combined unless they are at least −2 db $E_b/N_o$ or greater. Therefore, if a finger is 4 db $E_b/N_o$, the lock detect loop determines if a second finger is above the threshold value of −2 db $E_b/N_o$. Signals with lower SNRs could be combined if other combining methods are used.

If in step 532, the signal energy is below the energy threshold, then in step 534, the threshold comparison block 418 performs a threshold comparison between the percentage of correct decisions and percentage of correct decisions threshold. For a signal with a large SNR, comparing the maximum Walsh energy of a finger with a threshold value that is 6 db lower than the value of the strongest finger provides a good indication of lock. However, for a signal with a low SNR, determining lock by comparing the maximum Walsh energy with a threshold value that is 6 db lower than the value of the strongest finger gives a poor indication of lock because the large Walsh symbol error rate (WSER) increases the finger energy. For low energies, lock determination using the WSER provides a better indication of lock. For the finger at −2 db Eb/No, assuming the signal has additive white gassium noise (AWGN), the WSER for this signal will be about 80%. In other words, 80% of the maximum finger energy is attributed to noise. Because 80% of the maximum Walsh energy will be attributed to noise, making an accurate estimate of the SNR difficult. Because an accurate energy cannot be determined, a lock determination of the finger energy based on a comparison with a threshold cannot be made reliably.

However, comparing the index of the Walsh symbol error rate of low SNR signals with higher SNR signals does provide an indication of whether the lower SNR finger is in lock. Although the index of the WSER of a −2 db $E_b/N_o$ finger is only correct 20% of the time, this is well above the noise floor of 1.563% (1/64) of the time. For fingers between −2 db and 4 db $E_b/N_o$, the accuracy of the WSERs is between 20% and 80% respectively.

The determination of lock is based on a percentage of correct decisions which is one minus the WSER. In other words, when the percentage of correct decisions is 10% the Walsh symbol error rate is 90%. If the index of the maximum combined energy always equaled the index transmitted by the mobile telephone 106, for a SNR of −2 db, on average 20% of the time, the index of the maximum finger energy would be equal to the index of the transmitted Walsh symbol. However, because the index of the maximum combined energy does not always equal the index that was transmitted by the mobile telephone 106, a lower percentage threshold is used to determine if the signal is in lock. If the index of the combined energy was the same as the index of the symbol transmitted by the phone, then the threshold comparison would be 20% rather than 10%.

In step 536, the lock status is provided. The lock status is sent to the channel element microprocessor 208. The channel element microprocessor 208 works with the integrated search processor to determine whether a finger should be assigned to a path. The channel element microprocessor uses the two lock determinations in its evaluation. If a signal is consistently not in lock and the integrated search processor 304 finds a stronger signal, the channel element microprocessor 208 will reassign the finger to the path that has a stronger signal.

In step 538, the combine status is provided to the finger energy combiner 410. As mentioned previously, the combine status is used by the finger energy combiner 410 to determine whether the energies of a particular signal should be combined with the energies of other signals received by channel element modem 206.

While various embodiments of the present invention have been described above, it should be understood that they have been presented by way of example only, not limitation. Thus, the breadth and scope of the present invention should not be limited by any of the above-described exemplary embodiments, but should be defined only in accordance with the following claims and their equivalents.

What is claimed is:

1. A method for determining if a signal is in lock, comprising the steps of:
   (a) obtaining a maximum energy index of the signal;
   (b) obtaining a reference maximum energy index;
   (c) comparing said maximum energy index with said reference maximum energy index;
   (d) determining whether said maximum energy index and said reference maximum energy index are identical;
   (e) collecting a plurality of comparisons of said maximum energy index and said reference maximum energy index;
   (f) calculating a percentage of comparisons of said maximum energy index and said reference maximum energy that are identical; and
   (g) comparing said calculated percentage with a threshold percentage.

2. The method of claim 1, wherein step (a) comprises the steps of:
   correlating the signal with 64 Walsh sequences to produce 64 correlated energies;
   determining a maximum of said 64 correlated energies; and
   determining a six digit representation of said maximum of said 64 correlated energies, wherein said six digit representation is said maximum energy index.

3. The method of claim 1, wherein step (a) comprises the steps of:
   correlating the signal with a plurality of sequences to produce a plurality of correlated energies;
   determining a maximum of said plurality of correlated energies; and
   determining a six digit representation of said maximum of said plurality of correlated energies, wherein said six digit representation is said maximum energy index.

4. The method of claim 1, wherein step (b) comprises the steps of:
   combining energies of a plurality of signals;
   determining a maximum combined energy of said combined energies of said plurality of signals; and
   determining a six digit representation of said maximum combined energy, wherein said six digit representation is a maximum combined energy index; wherein said combined maximum energy index is said reference maximum energy index.

5. The method of claim 1, wherein step (c) comprises the steps of:
   (i) comparing a maximum energy index bit of said maximum energy index with a maximum combined energy index bit of said maximum combined energy index;
   (ii) determining whether said maximum energy index bit is identical to said maximum combined energy index bit; and
   (iii) repeating steps (i) through (ii) until each one of a plurality of maximum energy index bits has been compared to a corresponding one of a plurality of maximum combined energy index bits.

6. A computer component, comprising:

first obtaining means for obtaining a maximum energy index of a signal;

second obtaining means for obtaining a reference maximum energy index;

comparing means for comparing said maximum energy index with said reference maximum energy index;

determining means for determining whether said maximum energy index and said reference maximum energy index are identical;

collecting means for collecting a plurality of comparisons of said maximum energy index and said reference maximum energy index;

calculating means for calculating a percentage of said plurality of comparisons that said maximum energy index and said reference maximum energy are identical; and comparing means for comparing said percentage with a threshold percentage.

7. The computer component of claim 6, wherein said first obtaining means, comprises:

correlating means for correlating said signal with a plurality of sequences to produce a plurality of correlated energies;

second determining means for determining a maximum of said plurality of said correlated energies; and third determining means for determining a six digit representation of the maximum of the plurality of correlated energies, wherein said six digit representation is said maximum energy index.

8. The computer component of claim 6, wherein said second obtaining means, comprises:

combining means for combining energies of a plurality of signals;

second determining means for determining a maximum combined energy of said combined energies of said plurality of signals; and third determining means for determining a six digit representation of said maximum combined energy, wherein said six digit representation is a maximum combined energy index, wherein said combined maximum energy index is said reference maximum energy index.

9. The computer component of claim 6 wherein said comparing means, comprises:

comparing means for comparing a maximum energy index bit of said maximum energy index with a maximum combined energy index bit of said maximum combined energy index; and second determining means for determining whether said maximum energy index bit is identical to said maximum combined energy index bit.

10. A system for lock detection, comprising:

a maximum energy determination element for determining the maximum energy in correlated energies input for signal lock detection;

a first digital filter coupled to an output of said maximum energy determination element;

an index comparison element coupled to a second output of said maximum energy determination element for determining the index associated with maximum determined energy;

a combined maximum energy determination element coupled to an input of said index comparison element to combine a plurality of determined maximum energies;

a second digital filter coupled to said index comparison element; and a threshold comparison element coupled to an output of each of said first and second digital filters for comparing said outputs to predetermined threshold values.

11. The system of claim 10, further comprising:

an energy determination element coupled to an input of said maximum energy determination element for determining the energy in each of a plurality of correlated digital signal samples.

12. The system of claim 10, further comprising:

an energy combiner coupled to outputs for each of said energy determination element and to said threshold comparison element to combine the plurality of determined energies.

13. The system of claim 10, further comprising:

a transform processor coupled to an input of said energy determination element for providing correlated energies for received signal samples; and a channel element microprocessor coupled to an input of said threshold comparison element.

* * * * *